3,203,869
11α - HYDROXYLATION OF 6-SUBSTITUTED-11-
DESOXY STEROIDS WITH MICROORGANISMS
OF THE GENUS FUSARIUM, LISEOLA SECTION
Carlos Casas-Campillo, Mexico City, Mexico, assignor to
Syntex Corporation, Panama, Panama, a corporation
of Panama
No Drawing. Filed June 17, 1963, Ser. No. 288,495
Claims priority, application Mexico, Oct. 11, 1962,
69,298
10 Claims. (Cl. 195—51)

This invention relates to a novel process for preparing cyclopentanoperhydrophenanthrene derivatives.

More particularly, this invention relates to a novel process for the 11α-hydroxylation of 11-desoxy steroids which are substituted at the 6-position by a lower alkyl group, e.g., a methyl group, or by a halogen, e.g., fluorine or chlorine, by incubating said 11-desoxy steroids with microorganisms of the genus Fusarium, Liseola Section.

It is well known that the majority of the compounds of the pregnane series which have therapeutic activity, and especially those which show corticoid activity, and which, therefore, are used as anti-inflammatory agents, possess an oxygen function at the 11-position. In addition, it has been demonstrated that the 11β-oxygenated steroids having a halogen atom at the 9α-position are powerful anti-inflammatory agents which are useful in the treatment of conditions such as arthritis, allergic dermatitis, and the like.

Various microbiological methods for the introduction of a hydroxyl group at the 11-position of the steroid molecule are known in the art. Among the microorganisms which have been employed for this purpose are fungi of the genera Aspergillus, Penicillium, Rhizopus, Mucor, Pestalotia, Neurospora and Helicostylum [for example see H. Eppstein et al., "Vitamins and Hormones," vol. 14, page 359 (1959)].

However, attempts to carry out 11-hydroxylation of steroids substituted at the 6-position using the aforementioned microorganisms have resulted in very poor yields.

U.S. Patent No. 2,950,226 to Mannhardt et al. describes the 11α-hydroxylation of Δ⁴-3-keto steroids and their Δ¹ and/or Δ⁶-analogs, having the dihydroacetone side chain, using microorganisms of the genus Fusarium. The strains mentioned in said patent are those belonging to the Sections Discolor, Gibbosum and Elegans Oxysporum, e.g., *F. equiseti* var., *bullatum* [Taxonomic System of H. W. Wollenweber and A. O. Reinking, "Die Fusarien, ihre Beschreibung, Schadwirkung und Bekämpfung," Berlin (1935)]. Nevertheless, the more frequent transformations effected by different species of Fusaria are hydroxylations at the 6β- and 15α-positions of the steroid molecule [for example see Capek et al., Folia Microbiol., vol. 5, pages 251–256 (1960); Klüber et al., Naturwiss., vol. 44, page 40 (1957), and Gubler et al., Hel. Chim. Acta, vol. 41, page 301 (1958)]. In this vein, I have previously accomplished the 6β-hydroxylation of steroids by using microorganisms of the Fusarium genus, particularly those belonging to the Liseola Section ("Gruppe Liseola" of the aforementioned Taxonomic System of Wollenweber and Reinking), and specifically the transformation of Reichstein's compound "S" into the corresponding 6β-hydroxy derivative, without appreciable hydroxylation taking place in other positions on the steroid molecule.

The present invention is based on the surprising discovery that when 11-desoxy steroids substituted at the 6-position by a lower alkyl group, e.g., a methyl group, or by a halogen, e.g., fluorine or chlorine, are contacted with cultures of microorganisms of the genus Fusarium, Liseola Section, or with enzymes produced by said cultures, 11α-hydroxylation is accomplished in almost quantitative yields.

It is, therefore, an object of my invention to provide a novel method for the preparation of cyclopentanoperhydrophenanthrene derivatives.

It is also an object of my invention to provide a novel method of 11α-hydroxylating 11-desoxy steroids which are substituted at the 6-position by a lower alkyl group or a halogen which involves the use of microorganisms of the genus Fusarium, Liseola Section.

These and other objects of my invention will be discussed in greater detail hereinbelow.

The process of the present invention may be employed for the 11α-hydroxylation of 11-desoxy-6-alkyl or 6-halo steroids of the androstane, pregnane, cholestane and sapogenin series. Accordingly, several types of side chain may be present at the 17-position in the steroid starting material or substrate, and substituents such as keto groups, free or esterified hydroxyl groups, lower alkyl, alkenyl and alkinyl groups, halogens, acetals, ketals, ether groups, and the like, may also be present at the 17-position as well as at other positions on the steroid nucleus. Furthermore, these starting materials can be saturated or unsaturated at the 1,2-, 4,5- and/or 6,7-positions.

A particularly preferred class of steroid starting materials for use in the practice of the present invention encompasses the 11-desoxy-6-alkyl and -halo pregnane derivatives represented by the general formula:

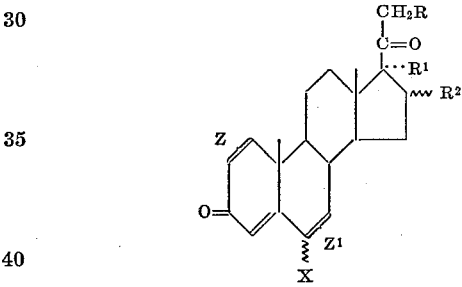

wherein R represents hydrogen, a hydroxyl group or an acyloxy group, preferably a hydrocarbon carboxylic acyloxy group, containing less than 12 carbon atoms, e.g., acetoxy, propionoxy, butyroxy, enanthoyloxy, benzoyloxy, trimethylacetoxy, cyclopentylpropionyloxy, and the like; $R^1$ represents hydrogen or a hydroxyl group; $R^2$ represents hydrogen, α-methyl, β-methyl, or α-hydroxy; $R^1$ and $R^2$ taken together can also represent the grouping:

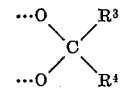

wherein $R^3$ and $R^4$ can each represent hydrogen, an alkyl (including cycloalkyl) group containing up to 8 carbon atoms, or an aryl, aralkyl, alkaryl or monocyclic heterocyclic group, and $R^3$ and $R^4$ taken together can also represent a cycloalkyl, aryl, aralkyl, alkaryl or monocyclic heterocyclic group; X represents a lower alkyl group, e.g., a methyl group, or a halogen, e.g., fluorine or chlorine, in either the α- or the β-configuration, preferably the former, and Z and $Z^1$ represent single or double bonds at the 1,2 and 6,7-positions respectively.

An illustrative but by no means exhaustive listing of starting materials coming within the scope of this general formula which can be hydroxylated at the 11α-position by the process of the present invention includes:

6α - methylprogesterone, 6β - methylprogesterone, 6α-fluoroprogesterone, 6α - chloroprogesterone, 6α - methyl-17α-hydroxyprogesterone, 6β-methyl-17α-hydroxyprogesterone, 6α - fluoro-17α-hydroxyprogesterone, 6α-chloro- 17α-hydroxyprogesterone, 6α-methyl-21-hydroxyprogesterone, 6α-fluoro-21-hydroxyprogesterone, 6β-fluoro-21-hydroxyprogesterone, 6α-chloro-21-hydroxyprogesterone, 6α-methyl-$\Delta^{1,4}$-pregnadiene-3,20-dione, 6α-methyl-$\Delta^{1,4}$-pregnadien-17α-ol-3,20-dione, 6α-fluoro-$\Delta^{1,4}$-pregnadien-21-ol-3,20-dione, 6α-methyl-$\Delta^{4}$-pregnene-17α,21-diol-3,20-dione, 6α-fluoro-$\Delta^{4}$-pregnene-17α,21-diol-3,20-dione, 6α-chloro-$\Delta^{4}$-pregnene-17α,21-diol-3,20-dione, 6α-methyl-$\Delta^{1,4}$-pregnadiene-17α,21-diol-3,20-dione, 6α-fluoro-$\Delta^{1,4}$-pregnadiene-17α,21-diol-3,20-dione, 6α-methyl-16α,17α-isopropylidenedioxy-$\Delta^{4}$-pregnen-21-ol-3,20-dione, 6α-fluoro-16α,17α-isopropylidenedioxy-$\Delta^{4}$-pregnen-21-ol-3,20-dione, 6α-chloro-16α,17α-isopropylidenedioxy-$\Delta^{4}$-pregnen-21-ol-3,20-dione, 6α-fluoro-16α,17α-isopropylidenedioxy-$\Delta^{1,4}$-pregnadien-21-ol-3,20-dione, 6α-chloro-16α,17α-isopropylidenedioxy-$\Delta^{1,4}$-pregnadiene-21-ol-3,20-dione, 6α,16α-dimethyl-$\Delta^{4}$-pregnene-17α,21-diol-3,20-dione, 6α-fluoro-16α-methyl-$\Delta^{4}$-pregnene-17α,21-diol-3,20-dione, 6α-chloro-16α-methyl-$\Delta^{4}$-pregnene-17α,21-diol-3,20-dione, 6α,16α-dimethyl-$\Delta^{1,4}$-pregnadiene-17α,21-diol-3,20-dione, 6α-fluoro-16α-methyl-$\Delta^{1,4}$-pregnadiene-17α,21-diol-3,20-dione, 6α-chloro-$\Delta^{4,6}$-pregnadien-17α-ol-3,20-dione, 6α-chloro-$\Delta^{4,6}$-pregnadiene-17α,21-diol-3,20-dione, 6α-chloro-16α-methyl-$\Delta^{1,4,6}$-pregnatriene-17α,21-diol-3,20-dione, and the like.

As previously indicated, 11-desoxy-6-alkyl and -halo steroids of the androstane series, e.g., 6α-methyltestosterone, 6α-fluorotestosterone, 6α-chlorotestosterone, 6α-methyl-$\Delta^{1,4}$-androsten-17β-ol-3-one, 6α,17α-dimethyltestosterone, 6α-fluoroandrostenedione, and the like, may also be used as starting materials to produce, in each case, the corresponding 11α-hydroxy derivatives.

The classifications which have been proposed for the various strains of Fusarium are generally complicated, and can give rise to certain ambiguities. However, this presents no problem with respect to the practice of the present invention, inasmuch as my novel hydroxylation method employs microorganisms from the well-defined Liseola Section of the genus Fusarium, as set forth, for example, in the aforementioned Taxonomic System of Wollenweber and Reinking. The following strains are especially preferred:

*Gibberella fujikuroi* (*Fusarium moniliforme*), Syntex strain IH–4 (ATCC No. 14842), and
*Gibberella fujikuroi* (Saw.) Wr. (Centraalbureau voor Schimmelcultures, Baarn, Holland, Nos. 917, 1001, 1004 and 1139; ATCC Nos. 11573, 12764, 9851, 11161 and 10704).

These microorganisms are also known as:

*Fusarium moniliforme* (Sheld),
*Fusarium moniliforme* var. *anthophilum* (A. Br.) Wr.,
*Fusarium moniliforme* var. *erumpens* (Wr. et Rkg.),
*Fusarium moniliforme* var. *fici* Cald,
*Fusarium moniliforme* var. *magus* Wr. Rkg., and
*Fusarium moniliforme* var. *minus* Wr.

The following Wollenweber strains of Fusarium (Centraalbureau vor Schimmelcultures, Baarn, Holland), may also be used:

*Gibberella fujikuroi*, (Saw.) var. *subglutinans* Edw.,
*Fusarium lactis* Pir. et Rib., and
*Fusarium neoceras* Wr. et Rg.

In practicing the present inventiion a culture of a microorganism of the genus Fusarium, Liseola Section, is incubated under aerobic conditions in a suitable culture medium, i.e., one containing carbohydrates, salts, and organic nitrogen sources, at a temperature between about 25° C. and 28° C., until an abundant growth of the mycelium is obtained, usually in approximately 3 to 5 days.

Among the culture media which can be used are those containing potato dextrose-agar and Czapek-agar (Czapek's medium, Difco Laboratories, Inc., Detroit, Mich.; a mixture of sucrose, sodium nitrate, potassium phosphate, magnesium sulfate, potassium chloride, ferrous sulfate and bacto-agar).

Among the nitrogen sources which can be employed in the culture medium are soya bean flour, corn flour, and commercial products such as Casitone, Edamine, Phytone (an enzymatic digest of soya meal; Baltimore Biol. Lab., Baltimore, Md.), Mycophil, and the like. Other carbohydrates which can be employed are glucose, lactose, and the like.

The mycelium obtained by incubating the microorganism in the culture medium can be used in any of several ways to convert the steroid starting material to its 11α-hydroxy derivative.

In one method, the mycelium is first dispersed and aliquot quantities of this dispersion are then added to bigger quantities of the same culture medium. Next, the steroid starting material is added, either in crystalline form or in solution in a suitable solvent, preferably dioxane, and the mixture is incubated, with stirring, under aerobic conditions to facilitate the growth of the microorganism and the oxygenation of the steroid starting material.

Alternatively, the culture medium may be inoculated under sterile conditions with a culture of the microorganism, and either simultaneously or when the growth of the microorganism has been initiated, the steroid starting material is added.

Enzymatic preparation of the oxygenating microorganism can also be employed, using methods which are well known to those skilled in the art.

However, the method which affords best results is that wherein the microorganism is first developed in a suitable culture medium, under aerobic conditions and in the absence of the steroid starting material. The resulting mycelium is then separated from the medium by filtration, washed with distilled water, and resuspended in Czapek's medium supplemented with 0.05% yeast extract, in which the steroid starting material has been previously suspended. The resulting mixture is stirred and aerated at a temperature between 25° C. and 28° C. for a period of time in the order of 12 to 24 hours, following which the reaction product is isolated by extraction with a suitable solvent.

In general, a concentration of the steroid starting material of about 5% by weight, based on the total weight of the substrate, will be employed, although concentrations greater or less than this amount can also be used.

When the oxygenation process is completed, as can be determined, for example, by paper chromatography in accordance with the Zaffaroni method ["Recent Progress in Hormone Research," vol. VIII, pages 51–86 (1953)], the product may be recovered from the mixture by extraction with a solvent which is immiscible with water. Included among the solvents which can be employed are chlorinated hydrocarbons and organic esters, such as chloroform, methylene chloride, carbon tetrachloride, ethylene dichloride, ethyl acetate, and the like. The extract obtained may be reduced to a small volume or evaporated to dryness, thus producing a solid product which can then be purified by any of several methods, the most common being chromatography and crystallization.

11α-hydroxylation of 11-desoxy-6-alkyl and -halo steroids may also be carried out using spores of microorganisms of the genus Fusarium, Liseola Section, which are free from the mycelium formed during fermentation, in an aqueous medium free from nutritional substances. In order to obtain spores free from the mycelium, the vegetative growth obtained in a suitable culture medium containing carbohydrates, salts and organic nitrogen sources, preferably Czapek's medium, is first filtered through glass wool to separate the mycelium. The resulting filtrate is centrifugated to separate the spores, which are then washed with water several times to completely eliminate the nutritional medium. The spores thus obtained may be kept in dried form or suspended in water or buffered solutions at a low temperature. Furthermore, such suspensions may be standardized to contain a definite number of spores per cubic centimeter.

The 11α-hydroxy steroids obtained through the process of the present invention can be converted, using known methods, into the corresponding 11-keto steroids. Where a 21-hydroxy group is also present, it will be protected by selective esterification or by formation of the 17,20;20,21-bismethylenedioxy grouping before converting the 11α-hydroxy group to an 11-keto group. These 11α-hydroxy steroids can also be converted into the corresponding 9α-halo-11β-hydroxy and 9α-halo-11-keto steroids by methods such as that described by Fried et al. in J. Am. Chem. Soc., vol. 79, No. 5, pages 1130–1141 (1957).

In order that those skilled in the art may more fully understand the present invention, the following examples are set forth. These examples are given solely by way of illustration, and should not be considered as expressing limitations unless so set forth in the appended claims. All parts and percentages are by weight, unless otherwise stated.

Example I

The vegetative growth of *Gibberella fujikuroi* (*Fusarium moniliforme*), ATCC 11161, obtained after one week's incubation at 25° C. in an inclined test tube containing a potato dextrose-agar medium was suspended in 10 cc. of sterile water. One cc. of this suspension was then used to inoculate 10 one liter Erlenmeyer flasks, each containing 200 cc. of Czapek's solution supplemented with 0.05% of yeast extract. The flasks were stirred in the presence of air, under submerged conditions (rotatory shakers operated at 150 r.p.m.) for 18 to 21 hours to obtain an abundant growth of the microorganism. To each flask there was then added 50 mg. of 6α-fluoro-16α,17α-isopropylidenedioxy-Δ$^4$-pregnen-21-ol-3,20-dione, and the incubation was resumed for 18 hours further under the same conditions. Following this incubation period, the contents of the flasks were combined and then extracted several times with methylene chloride, dried over anhydrous sodium sulfate, and evaported to dryness under reduced pressure. The residue was dissolved in methylene chloride, absorbed in a column charged with 15 grams of silica gel and 15 grams of celite. The fractions eluted from the column with ether and ether-acetone (90/10) were found to contain 350 mg. of 6α-fluoro-16α,17α-isopropylidenedioxy - Δ$^4$-pregnene-11α,21-diol-3,20-dione, M.P. 255–257° C. λ max. 236–238 mμ, log ε 4.19.

Example II

The procedure of Example I was repeated in every detail but one. The oxygenating agent used was a culture of *Gibberella fujikuroi* (*Fusarium moniliforme*), Syntex strain IH–4, ATCC No. 14842, and 6α-fluoro-6α,17α-isopropylidenedioxy-Δ$^4$-pregnene-11α,21-diol-3,20 - dione was produced in similar yield.

Example III

Each of 10 one liter Erlenmeyer flasks containing 200 cc. of Czapek's solution supplemented with 0.05% of yeast extract were inoculated with 1 cc. of an aqueous microbial suspension of *Gibberella fujikuroi* (*Fusarium moniliforme*) Syntex strain IH–4, ATCC No. 14842, obtained by superficial growth in potato dextrose-agar in an inclined test tube in the manner described in Example I.

Immediately after the addition of the microbial suspension, 50 mg. of 6α-fluoro-16α-methyl-Δ$^4$-pregnene-17α,21-diol-3,20-dione were added to each flask, and the flasks were then stirred under aerobic conditions for 24 hours. The contents of the flasks were combined, extracted with chloroform, and the organic extract washed with water, dried, and evaporated to dryness under reduced pressure. By chromatography of the residue on silica gel-Celite there was obtained 6α-fluoro-16α-methyl-Δ$^4$-pregnene-11α,17α,21-triol-3,20-dione in 75% yield.

Example IV

The procedure of Example III was repeated but instead of adding the steroid starting material in solid form, it was added dissolved in 2 cc. of dioxane per 50 mg. of steriod. Again 6α - fluoro - 16α - methyl-Δ$^4$-pregnene-11α, 17α,21-triol-3,20-dione was produced, this time in 68% yield.

Example V

In accordance with the methods described in Examples I and II hereinabove, the steroid starting materials listed below (I) were converted into the corresponding 11α-hydroxy derivatives (II).

| I | II |
| --- | --- |
| 6α-fluoro-Δ$^4$-pregnene-17α,21-diol-3,20-dione. | 6α-fluoro-Δ$^4$-pregnene-11α,17α,21-triol-3,20-dione. |
| 6α-fluoro-Δ$^{1,4}$-pregnadiene-17α,21-diol-3,20-dione. | 6α-fluoro-Δ$^{1,4}$-pregnadiene-11α,17α,21-triol-3,20-dione. |
| 6α-fluoro-16α-methyl-Δ$^{1,4}$-pregnadiene-17α,21-diol-3,20-dione. | 6α-fluoro-16α-methyl-Δ$^{1,4}$-pregnadiene-11α,17α,21-triol-3,20-dione. |
| 6α-fluoro-progesterone | 6α-fluoro-11α-hydroxy-progesterone. |
| 6α-methyl-17α-hydroxyprogesterone. | 6α-methyl-11α,17α-dihydroxyprogesterone. |
| 6α-methyl-Δ$^4$-pregnene-17α,21-diol-3,20-dione. | 6α-methyl-Δ$^4$-pregnene-11α,17α,21-triol-3,20-dione. |
| 6α,16α-dimethyl-Δ$^4$-pregnene-17α-21-diol-3,20-dione. | 6α,16α-dimethyl-Δ$^4$-pregnene-11α,17α,21-triol-3,20-dione. |
| 6α-chloro-Δ$^4$-pregnene-17α,21-diol-3,20-dione. | 6α-chloro-Δ$^4$-pregnene-11α,17α,21-triol-3,20-dione. |
| 6α-chloro-Δ$^{4,6}$-pregnadiene-17α-ol-3,20-dione. | 6α-chloro-Δ$^{4,6}$-pregnadiene-11α,17α-diol,3,20-dione. |
| 6α-chloro-16α-methyl-Δ$^4$-pregnene-17α,21-diol-3,20-dione. | 6α-chloro-16α-methyl-Δ$^4$-pregnene-11α,17α,21-triol-3,20-dione. |
| 6α-chloro-16α,17α-isopropylidenedioxy-Δ$^{1,4}$-pregnadien-21-ol-3,e 20-dione. | 6α-chloro-16α,17α-isopropylidenedioxy-Δ$^{1,4}$-pregnadiene-11α,21-diol-3,20-dione. |

Example VI

In accordance with the method described in Example I, 6α-fluoro-16α,17α-isopropylidenedioxy-Δ$^{1,4}$-pregnadien-21-ol-3,20-dione was incubated, under aerobic conditions, with a vegetative growth of *Fusarium lactis* Pir. et Rib., Wollenweber strain, originally received from the Centraalbureau voor Schimmelcultures, Baarn, Holland, to produce 6α-fluoro-16α,17α-isopropylidenedioxy - Δ$^{1,4}$-pregnadiene-11α,21-diol-3,20-dione in 62% yield.

Example VII

The procedure of Examples VI was again repeated, with a culture of *Fusarium neoceras* Wr. et Rg., Wollenweber (Centraalbureau voor Schimmelcultures, Baarn, Holland), as the inoculum to again produce 6α-fluoro-16α,17α-isopropylidenedioxy - Δ$^{1,4}$ - pregnadiene - 11α,21-diol-3,20-dione in similar yield.

Example VIII

The method of Example I was repeated, using as the oxygenating microorganism *Gibberella fujikuroi* No. 1001 (Centraalbureau voor Schimmelcultures, Baarn, Holland), to produce 6α-fluoro-16α,17α-isopropylidenedioxy-Δ$^4$-pregnene-11α,21-diol-3,20-dione.

Example IX

To a 14 liter fermentor containing 10 liters of Czapek's medium supplemented with 0.05% of yeast extract there was added 50 cc. of an aqueous suspension of *Gibberella fujikuroi* (*Fusarium moniliforme*), Syntex strain IH–4, ATCC No. 14842. Next, 2 grams of 6α-fluoro-16α, 17α-isopropylidenedioxy-Δ$^4$-pregnen-21-ol-3,20-dione, dissolved in 10 cc. of dioxane, were added and the mixture stirred under aeration (600 liters of air per hour) for 18 hours, at the end of which time the amount of hydroxlated compound was determined by paper chromatography (Zaffaroni's method). The incubation was continued for 6 hours further following which time there were then added 3 liters of methylene chloride to extract the product. This extraction operation was repeated three times. The combined extracts were then washed with water to neutral, dried, and evaporated to dryness. By chromatography of the residue on silica gel there was obtained 6α-fluoro-16α, 17α-isopropylidenedioxy - Δ⁴-pregnene - 11α, 21-diol-3, 20-dione in 75% yield.

*Example X*

The oxygenating microorganism *Gibberella fujikuroi* (*Fusarium moniliforme*) ATCC 1161, was cultivated in the above mentioned Czapek-yeast extract medium and then divided and placed in a number of 125 cc. Erlenmeyer flasks each containing 25 cc. of the same medium. After incubation at 25–28° C. with stirring for 4 hours, using rotatory shakers, there was obtained a growth formed by a very diffused mycelium and a great amount of spores of the fungus. This culture was passed through a glass wood layer placed in a Buchner funnel in order to retain the dispersed mycelium and let pass only the spores. The spores were recovered from the filtrate by centrifugation, washed with sterile water and resuspended in an equal volume of a phosphate buffer solution, pH 7.0. This suspension was then divided into 25 cc. portions and placed in a number of 125 cc. Erlenmeyer flasks. To each flask there was then added 5 mg. of 6α-methyl-Δ⁴-pregnene-17α,21-diol-3,20-dione, and the resulting mixture was incubated for 18 hours, with stirring, using rotatory shakers. After this period of time the transformed steroid was extracted in a similar manner to that previously described. There was thus obtained 6α-methyl-Δ⁴-pregnene-11α,17α,21-triol-3,20-dione in 60% yield.

*Example XI*

To a solution of 0.5 g. of 6α-fluoro-16α-methyl-Δ⁴-pregnene-11α,17α,21-triol-3,20-dione, obtained as described in Example III, in 20 cc. of chloroform, there were added 4 cc. of a 30% aqueous solution of formaldehyde and 0.5 cc. of concentrated hydrochloric acid. The resulting mixture was stirred for 48 hours at room temperature. The resulting 2-layer mixture was separated, the aqueous layer was washed with chloroform, the chloroform washings were combined with the organic layer, and the combined organic solution was washed with water to neutral, dried over anhydrous sodium sulfate and evaporated to dryness. The residue was recrystallized from methanol ether, thus producing 17,20;20,21-bismethylenedioxy-6α-fluoro-16α - methyl - Δ⁴ - pregnen-11α-ol-3-one.

The foregoing bismethylenedioxy compound was dissolved in 20 cc. of acetone, cooled to 0° C., and then treated under an atmosphere of nitrogen, while stirring, with an 8 N solution of chromic acid (prepared by mixing 26 g. of chromium trioxide with 23 cc. of concentrated sulfuric acid and dilution with water to 100 cc.) until the color of the reagent persisted in the mixture. The reaction mixture was then stirred for 5 minutes further at 0–5° C. and then diluted with water. The resulting precipitate was filtered, washed with water and dried under vacuum. A mixture of 400 mg. of the resulting crude compound and 10 cc. of 60% formic acid was heated on the steam bath for 1 hour, then cooled and diluted with water, dried and recrystallized from acetone-hexane, thus producing 6α-fluoro-16α-methyl cortisone, identical to an authentic sample.

*Example XII*

Example III was repeated, using *Gibberella fujikuroi* (*Fusarium moniliforme*), ATCC 10704, as the oxygenating microorganism, thus producing 6α-fluoro-16α-methyl-Δ⁴-pregnene-11α,17α,21-triol-3,20-dione in 68% yield.

It will be obvious to those skilled in the art that other changes and variations can be made in carrying out the present invention without departing from the spirit and scope thereof as defined in the appended claims.

I claim:

1. A process for the conversion of an 11-desoxy steroid which is substituted at the 6-position with a member selected from the group consisting of a lower alkyl group and a halogen to the corresponding 11α-hydroxy steroid which comprises subjecting said 11-desoxy steroid to the oxygenating action of a microorganism of the genus Fusarium, Liseola Section.

2. A process as described in claim 1 wherein the microorganism of the genus Fusarium, Liseola Section, is *Gibberella fujikuroi* (*Fusarium moniliforme*), ATCC No. 14842.

3. A process as described in claim 1 wherein the microorganism of the genus Fusarium, Liseola Section, is *Gibberella fujikuroi* (*Fusarium moniliforme*), ATCC No. 10704.

4. A process as described in claim 1 wherein the microorganism of the genus Fusarium, Liseola Section, is *Gibberella fujikuroi* (*Fusarium moniliforme*), ATCC No. 11161.

5. A process as described in claim 1 wherein the microorganism of the genus Fusarium, Liseola Section, is *Fusarium neoceras* Wr. et Rg. (Wollenweber).

6. A process as described in claim 1 wherein the microorganism of the genus Fusarium, Liseola Section, is *Fusarium lactis* Pir. et Rib. (Wollenweber).

7. A process for the conversion of an 11-desoxy steroid represented by the general formula:

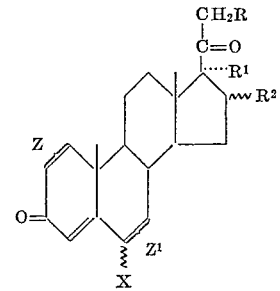

wherein R is selected from the group consisting of hydrogen, a hydroxyl group and an acyloxy group containing less than 12 carbon atoms; $R^1$ is selected from the group consisting of hydrogen and a hydroxyl group; $R^2$ is selected from the group consisting of hydrogen, α-methyl, β-methyl and α-hydroxy; $R^1$ and $R^2$ taken together represent the grouping:

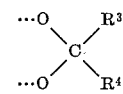

wherein $R^3$ and $R^4$ are each selected from the group consisting of hydrogen, an alkyl group containing up to 8 carbon atoms, an aryl group, an aralkyl group, an alkaryl group and a monocyclic heterocyclic group, and $R^3$ and $R^4$ taken together represent a member selected from the group consisting of a cycloalkyl group, an aryl group, an aralkyl group, an alkaryl group and a monocyclic heterocyclic group; X is selected from the group consisting of a lower alkyl group and a halogen, with the symbol ⌇ connecting X to the steroid nucleus representing both the α- and the β-configuration; Z is selected from the group consisting of a single bond and a double bond at the 1,2-position, and $Z^1$ is selected from the group consisting of a single bond and a double bond at the 6,7-position, to the corresponding 11α-hydroxy steroid which comprises subjecting said 11-desoxy steroid to the oxygenating action of a microorganism of the genus Fusarium, Liseola Section.

8. A process as described in claim 7 wherein said 11-desoxy steroid is 6α-fluoro-16α,17α-isopropylidenedioxy-Δ⁴-pregnen-21-ol-3,20-dione and the product obtained is 6α-fluoro-16α,17α-isopropylidenedioxy - Δ⁴ - pregnene-11α,21-diol-3,20-dione.

9. A process as described in claim 7 wherein said 11-desoxy steroid is 6α-fluoro-16α-methyl-Δ⁴-pregnene-17α,21-diol-3,20-dione and the product obtained is 6α-fluoro-16α-methyl-Δ⁴-pregnene-11α,17α,21-triol-3,20-dione.

10. A process as described in claim 7 wherein said 11-desoxy steroid is 6α-fluoro-Δ¹,⁴-pregnadiene-17α,21-diol-3,20-dione and the product obtained is 6α-fluoro-Δ¹,⁴-pregnadiene-11α,17α,21-triol-3,20-dione.

References Cited by the Examiner
UNITED STATES PATENTS

| | | | |
|---|---|---|---|
| 2,950,226 | 8/60 | Mannhardt et al. | 195—51 |
| 2,985,563 | 5/61 | Carvajal | 195—51 |
| 3,004,047 | 10/61 | Fried et al. | 195—51 |
| 3,084,106 | 4/63 | Hitzman et al. | 195—51 |

A. LOUIS MONACELL, *Primary Examiner.*